United States Patent [19]
Barber et al.

[11] Patent Number: 4,956,822
[45] Date of Patent: Sep. 11, 1990

[54] METHOD AND APPARATUS FOR SEISMIC EXPLORATION

[76] Inventors: Harold P. Barber, 3143 Cypress Point, Missouri City, Tex. 77459; Clyde Lee, 6321 Del Monte, Houston, Tex. 77057; Paul J. Ruckman, 509 W. Hillary, Sugar Land, Tex. 77478

[21] Appl. No.: 281,669

[22] Filed: Dec. 9, 1988

[51] Int. Cl.$^5$ .............................................. G01V 1/38
[52] U.S. Cl. ...................................... 367/23; 181/110; 181/115; 181/118; 114/253; 367/144
[58] Field of Search ............... 181/110, 111, 115, 118; 114/253; 367/15-17, 23, 24, 144

[56] References Cited

U.S. PATENT DOCUMENTS

| | | | |
|---|---|---|---|
| 3,310,128 | 1/1964 | Chelminski | 181/0.5 |
| 3,653,460 | 4/1972 | Chelminski | 181/0.5 |
| 3,953,826 | 4/1976 | Brundrit et al. | 340/7 PC |
| 4,141,431 | 2/1979 | Baird | 131/118 |
| 4,242,740 | 1/1978 | Ruehle | 367/15 |
| 4,326,271 | 4/1980 | Ziolkowski | 367/16 |
| 4,396,088 | 2/1981 | Bayhi | 181/120 |
| 4,686,660 | 8/1987 | Gjestrum et al. | 367/153 |
| 4,715,023 | 12/1987 | Otto | 367/144 |
| 4,716,553 | 12/1984 | Dragsund et al. | 367/15 |
| 4,719,987 | 1/1988 | George, Jr. et al. | 181/118 |
| 4,721,180 | 11/1986 | Haughland et al. | 181/111 |

OTHER PUBLICATIONS

"Effects of Marine Source Array Directivity on Seismic Data and Source Signature Deconvolution", by Loveridge et al., *First Break*, vol. II, No. 2, p. 16.
"Delft Air Gun Experiment", by Ziolkowski, *First Break*, Jun. 1984 edition, pp. 9-18.
"The Determination of the Far Field Signature of an Interacting Array of Marine Seismic Sourced from Near Field Measurements-Results from the Delft Air Gun Experiment", by Anton Ziolkowski, *First Break*, vol. 5, No. 1, pp. 15-29.
"On the Quality Control of Datagun Arrays", by Safer and Haskey, *First Break*, Nov. 1983, pp. 13-17.
"Marine Source Array Directivity: A New Wide Airgun Array System", by Parkes et al., *First Break*, Jul. 1984, pp. 9-15.
"Test Results of a New Type of Efficient Small Airgun Array", by M. H. Safar, *Geophysical Prospecting*, vol. 31, pp. 343-350 (1983).
"Development of More Efficient Air Gun Arrays: Theory and Experiment", by R. C. Johnston, 1982. *Geophysical Prospecting*, vol. 30, pp. 752-773.
"Signature and Amplitude of Linear Air Gun Arrays", by J. J. Nooteboom, *Geophysical Prospecting* 26, pp. 194-201 (1978).
"Attenuation of Coherent Noise in Marine Seismic Exploration Using Very Long Arrays", by B. Ursin, *Geophysical Prospecting*, vol. 26, pp. 722-749 (1978).
"Interaction Effects in Marine Seismic Source Arrays", by Sinclair and Bhattacharya, *Geophysical Prospecting* 28, pp. 323-332.
"Efficient Design of Air-Gun Arrays", by Safar, *Geophysical Prospecting*, vol. 24, pp. 773-787 (1976).
"The Signature of an Air Gun Array, Computation from Near-Field Measurements", by Parker et al., *Geophysics*, vol. 48, No. 2, Feb. 1984.

(List continued on next page.)

*Primary Examiner*—Ian J. Lobo
*Attorney, Agent, or Firm*—Dodge, Bush & Moseley

[57] ABSTRACT

A towable marine seismic source apparatus for producing a high resolution seismic signal at relatively shallow depths for engineering surveys is disclosed. The apparatus support frame operably mounts a plurality of eight identical chambered air guns in a 2×4×2 configuration to provide a tapered, heavy centered point source. The cylindrical air guns are positioned in a horizontal orientation at a predetermined depth of 1 to 3 meters and are synchronized to fire substantially simultaneously to achieve maximum peak energy output. Two chamber sizes of individual air guns (4 cu. in. & 10 cu. in.) are in a desired range and may be preferably employed in the array configuration to produce the seismic signal having distinct signature characteristics.

13 Claims, 4 Drawing Sheets

OTHER PUBLICATIONS

"The Signature of An Air Gun Array: Computation from Near Field Measurements Including Interactions", by Ziolkowski, et al., *Geophysics*, vol. 47, No. 10, Oct. 1982, pp. 1413–1421.

"Extended Arrays for Marine Seismic Acquisition", by Lofthouse and Bennett, *Geophysics*, vol. 43, No. 1 (Feb. 1978), pp. 3–22.

"Air Gun Source Instabilities" by Dragoset et al., *Geophysics*, vol. 52, No. 9 (Sep. 1987), pp. 1229–1251.

"A New High-Resolution or Deep Penetration Air Gun Array", by Brandsaeter et al., *Geophysics*, vol. 44, No. 5 (May 1979), pp. 865–879.

"Some Geometric Aspects of Towed Air Gun Arrays", by Teer et al., OTC 4254 (Offshore Technology Conference), May 1982 OTC.

"STAGARAY System Improves Primary Pulse/Bubble Ratio in Marine Exploration", by John Kologinczak, OTC 2020, May 1974 OTC.

"Marine Seismic Energy Source: Acoustic Performance Comparison", by Roy Johnston, OTC 4255, May 1982 OTC.

"Applications of Air Gun Energy Source for Offshore Seismic Work", by Hans Edelman, OTC 2513, May 1976 OTC.

"A Comprehensive Method for Evaluating the Design of Air Guns and Air Gun Arrays", by Bill Dragoset, OTC 4783, May 1984 OTC.

"The Versatilty of Sleeve Guns as Marine Acoustic Sources", by W. R. Cotton, OTC 4859, May 1985 OTC.

"A Versatile Energy Source Control System for Seismic Exploration Applications", by R. L. Roark, OTC 2514, May 1976 OTC.

"A Modern Marine Seismic System", by Pulju et al., OTC 2021, May 1974 OTC.

"The Mini Spread", by Burt et al., OTC 2177, May 1975 OTC.

"Seismic Signatures of Air Guns", by Mayne and Quay, OCT 1207, Apr. 1970 OTC.

"Maintaining Three-Dimensional Integrity of a Tuned Source Array", by Lauhoff et al, OTC 2783, May 1977 OTC.

"A Comprehensive Method for Evaluating the Design of Air Guns and Air Gun Arrays", by William Dragoset, *Geophysics: The Leading Edge of Exploration*, Oct. 1984, pp. 52–61.

"HWS 400 Water Gun: A New Step Toward Power and Resolution", by J. P. Fail, *Geophysics*.

"Directivity and Other Characteristics of a Wide Air Gun Array System", by Parkes, Hatton and Haugland, *Geophysics*, Oct. 1981.

"Three Dimensional Air Gun Arrays", by Smith, *Geophysics*, 1984 Marine II 1984.

"Air Gun Interdependency: Pursuit of the Spectral Limits", by John C. Wride and Dewey R. Young, II, Exxon Production Research Co. DA 2.8 pp. 79–82.

"Compact Sleeve-Gun Source Arrays", Philip M. Fontana, Western Atlas International, Western Research; and Tor-Arvid Haugland, Western Atlas International Norway A/S. DA 2.5 pp. 67–70.

"A Look at a New Seismic Array for VSP Applications", Dale J. Pennington, III, Schlumberger Offshore Services. DA 2.9 pp. 83–85.

"Comparison of Tuned Marine Seismic Arrays", Sverre Strandenes, Norsk Hydro A/S; Svwin Vaage, and Einar Nielsen, SERES A/S, Norway. DA 2.4 pp. 64–66.

METHOD AND APPARATUS FOR SEISMIC EXPLORATION

BACKGROUND OF THE INVENTION

The field of the present invention relates to seismic exploration and more particularly to a high resolution marine seismic signal source for exploration of the earth strata or crust located below a body of water.

Background

Marine seismic exploration of the earth strata located below a body of water, usually offshore, is well known. One common use is in the prospecting for hydrocarbons or other natural resources contained or trapped in relative deep formations in the earth crust. Another common use is obtaining engineering survey data and shallow strata information useful and necessary for suitable siting and foundation design of offshore structures, such as jack up rigs or permanent platforms for drilling and production operations.

In principal and theory, seismic prospecting is relatively simple. A pulse of seismic energy is produced from a known source and transmitted through the earth strata. The reflected energy signals from the subsurface strata and strata interfaces are detected and recorded as data by suitable instrumentation. By suitable calculations (including source signal deconvolution) or other processing of the recorded data, many characteristics of the subsurface strata, such as the depth, arrangement and thickness of the various layers or formations forming the strata and other significant information may be predicted with reasonable precision.

In actual practice of seismic prospecting the detection and processing calculations of the reflected energy signal data to predict the details of the investigated strata or formations is extremely complex and quite difficult. Each seismic energy source produces an energy signal having unique characteristics labeled the source signature. In deconvolution the signature characteristics are used to adjust the recorded data for those known imperfections in the seismic signal. Separating a true reflected seismic signal in the recorded data from noise or other signal echoes is an extremely difficult task and requires a great deal of skill and expertise. Furthermore, the characteristics of the pulse actually generated by the seismic source for transmission through the earth strata can greatly increase the difficulty of sensing or detecting the proper strata reflected energy or pulse signal. False detection of the reflected information will, of course, render the seismic determinations on that information incorrect.

Background Art

Numerous efforts and approaches have been made to improve the desired characteristic of the seismic pulse or source signal intentionally generated for transmission through the earth strata. One type of seismic energy source that has become widely accepted for use in the marine environment (offshore, rivers or swamps) is the commercially available air gun such as that disclosed in U.S. Pat. No. 3,653,460 to Chelminski or U.S. Pat. No. 4,141,431 to Baird. The signal source air gun is conventionally remotely operated from a towing marine (or amphibious) vessel to provide repeated energy pulses without significant damage to marine life. The air gun operates to provide a seismic energy pulse by suddenly releasing from a closed chamber of known volume of highly compressed air in explosive-like abruptness at a predetermined depth below the water surface. The pulse shape of the energy signal from the single air gun seismic source apparatus of U.S. Pat. No. 3,653,460 is illustrated under various controlled conditions in FIGS. 5-8.

A main disadvantage of an air gun seismic signal sources is the produced wave form which lacks power, has a multi-peaked spectrum and in the time domain is long and oscillatory and not minimum phase. Because of chamber size volume limitations of a single air gun seismic source apparatus, a single air gun is also usually inadequate to form an output signal adequate to provide a detectable reflected wave. For this reason and to overcome certain other disadvantages, a plurality of air guns are usually arranged in submerged arrays or subarrays of desired geometric configuration towed behind the moving seismic vessel.

One such air gun system and array is disclosed in U.S. Pat. No. 3,953,826 to Brundrit et al entitled "Super Long Seismic Source". A number or plurality of remote controlled air guns are arranged in arrays towed by (usually behind) a single marine vessel and which may have means to adjust the distance between the linear arrays. The reflected seismic signals from the air guns are detected by transducers (hydrophones) which may be trailed behind the same boat or marine vessel. Commercially available air guns such as disclosed in U.S. Pat. No. 3,310,128, are used as the individual seismic energy signal source in each array. Suitable conventional and known means to provide a continuous source of high pressure air and means for controlling the firing time of individual guns are mounted on the towing marine vessel and are operably connected using other well known and conventional umbilical means with each air gun forming the array. Suitable float or buoyancy means are provided to maintain the air guns at the desired depth below the water surface. As shown in FIG. 1, each array is formed by three guns submerged at the same desired water depth in a single linear row or two or more parallel rows. The array geometric arrangement is also used to form the principal direction of the seismic energy wave toward the earth strata being investigated.

U.S. Pat. No. 4,242,740 to Ruehle is entitled "Seismic Refraction Exploration". In this disclosed seismic technique the return signal receivers (hydrophones) are fixed and the seismic signal source towed by the boat pulling the array of seismic sources. The horizontal linear array of seismic signal sources are directed to provide a seismic pulse within certain angular limits for refractive exploration purposes. The primary direction of the seismic energy wave is controlled from the vessel by timing the firing of the output pulses of each air gun source in the array.

A pair of towed air gun arrays are disclosed in U.S. Pat. No. 4,326,271 to Ziolkowski. The two disclosed arrays of air guns are located a predetermined separation distance behind the boat to prevent interaction between the two arrays. The two horizontal (common depth) rectangular shaped geometry arrays are formed of different size or air gun spacing by a preselected factor between the individual guns. If the individual air gun point sources within an array are spaced less than about a wave length, the interaction effects between air gun sources become a significant factor. The seismic energy signal emitted or radiated by a point seismic sound source (a closely spaced plurality of air guns arranged so maximum dimension is small compared with the shortest wave length of useful radiation) forming the array is enhanced by the interaction effect of the plurality of individual sources. Many of the problems and limiting parameters of air gun array designs to achieve a desired wave form pattern of seismic energy are addressed in this patent.

Bayhi U.S. Pat. No. 4,396,088 discloses a hydraulic seismic energy signal source emitting useful signals in a desired low frequency range of 10 Hz to about 100 Hz that is also controlled from a towing boat. The low frequency range is desired in petroleum exploration for deep penetration into the earth strata below the body of water. The discussion in the field of the invention is helpful in identifying the different known methods for producing a seismic pulse or signal and the resulting associated problems of each method.

In U.S. Pat. No. 4,686,600 to Gjestrum et al there is disclosed a straight line seismic array of a plurality of 5 air gun point sources towed behind a boat. Each of the point source subarray of air guns is required to be positioned at substantially the same water depth. A float arrangement maintains a desired common depth for each of the air guns.

U.S. Pat. No. 4,715,023 to Otto is entitled "Coaxial, Dual Chamber Seismic Air Gun". The dual pressurized gas or air chambers are fired or released simultaneously to counterbalance the reactive forces occurring at the air discharge or firing. This arrangement is intended to overcome the various practical problems experienced in regard to the prior art air guns when used in a conventional towed straight line array.

U.S. Pat. No. 4,716,553 to Dragsund et al discloses a steerable float apparatus for supporting an array or plurality of seismic transmitters at a desired adjustable depth below the water surface behind a towing vessel. The transmitters are normally arranged in arrays of subarrays (point sources) which are remotely operated synchronously or according to a specified pattern during propagation initiation of the seismic energy pulses. U.S. Pat. No. 4,721,180 (Haughland et al) discloses a marine seismic source array of a plurality of air guns in which pairs of the air guns are vertically disposed below the water surface. Such arrangement is believed to attenuate both the bubble pulse oscillation and "ghost" pulse problems which occur in even arrays "tuned" by selection of air gun sizes and spacing.

"Tuning" of an array or subarray to form a desired seismic energy pulse to eliminate the secondary effects of surface reflections (ghost echoes) and bubble oscillation has been the subject of many publication. The following identification and discussion of such publication, like the above identification and discussion of patents is not to be considered comprehensive, but rather a sample of such information.

A July 1984 publication of Loveridge et al in First Break (Vol. II, No. 2, pp 16) is entitled "Effects of Marine Source Array Directivity on Seismic Data and Source Signature Deconvolution". (First Break is a monthly publication of Blackwell Scientific publications, Osney Mead, Oxford, England in association with the European Association of Exploration Geophysicists and copies may be obtained from the Copyright Clearance Center, 27 Congress Street, Salem, Mass. 01970) The problems of reliable computer modeling of seismic source array signatures including interaction effects between the source components of the array are explored for a number of array geometries and dimensions with emphasis on signal direction.

The "Delft air gun experiment" is the title of an article by Ziolkowski published at pp 9-18 in the June 1984 edition of First Break. As noted therein the ideal seismic source signal for exploration (deep strata investigation) is a short, sharp impulse lasting for not more than a few milliseconds. However, the common air gun provides an unsuitable, long, oscillating energy wave when measured at a distance of one meter. Despite the poor characteristics of the emitted seismic signal, other advantages have caused the air gun to become the industry standard. Two separate methods are considered to overcome the data resolution problems caused by the poor signal shape produced by a single air gun. The first is the use of the air guns in arrays of subarrays with each subarray being a point source having a plurality of air guns. The second, known as "signature deconvolution" is a computer manipulation or processing step of the recorded data to resemble data if a perfect impulse had been used. The source arrays (also shown in Pat. No. 4,326,271) conventionally employed a number of identical point source "tuned" subarrays consisting of a plurality of air guns of different chamber sizes spaced over a distance of 20 meters. By using air guns of different sizes the oscillating tails of the seismic signal tend to cancel each other out so the initial or primary peak to the later oscillating bubble pulse (the so called "primary-to-bubble ratio) is sufficiently large when the guns are fired together. The "tuned" array output signal may be measured to determine the characteristics of the far field signature of the array for use in "signature deconvolution".

In the January 1987 edition of First Break, Vol. 5, No. 1, pp. 15-29, Anton Ziolkowski updated the prior report of his study in an article entitled "The Determination of the Far Field Signature of an Interacting Array of Marine Seismic Sources from Near Field Measurements—Results from the Delft Air Gun Experiment". A comparison of the far-field measurement with near field measurement of the seismic signals from an interacting array of marine seismic sources is disclosed.

An article entitled "On the Quality Control of Datagun Arrays" by Safer and Haskey was published at pages 13-17 in the November 1983 issue of First Break which considers the theory of interacting bubbles produced by an array of air guns. The air bubble secondary effect dampening is assumed negligible when the spacing between the air guns in an array is greater than the wavelength. If the air gun spacing is less than the wave length the dampening of the "bubble effect" is greatly increased. In theory the air bubble dampening coefficient is given by the sum of the radiation dampening coefficient and the dampening coefficient due to heat loss. The effect of interaction on the air bubble radiation dampening coefficient is stated to be significant only when the arrays have at least ten small identical air guns with spacing considerably less than a wavelength. In most conventional air gun arrays the effect of radiation of interaction on the air bubble dampening coefficient may be neglected. The main advantage or feature of arrays is that they are distance and amplitude weighted to achieve a desired output signal.

"Marine Source Array Directivity: A New Wide Airgun Array System" is the title of an article by Parkes et al in the July 1984 issue of First Break, pp 9-15. Recognizing that the principle advantage of seismic source arrays is that the outgoing energy pulse may be shaped using array elements with different characteristics and the geometrical configuration may be adjusted to manipulate interference effects at seismic frequencies, this paper focuses on the direction (directivity) of the emitted or radiate seismic signal. A seismic air gun subarray is the basis of the wide source array system. The air guns are suspended from a float at a depth of 7.5 meters and are arranged in a straight line. Up to six subarrays may be configured to form the desired array, either wide (abreast) or long (in line).

An article entitled "Test Results of a New Type of Efficient Small Airgun Array" by M. H. Safar published in *Geophysical Prospecting*, Vol. 31, pp 343–350 (1983) considered the results obtained when an air gun was incorporated in a two-dimensional array. (*Geophysical Prospecting* is a quarterly journal of the European Association of Exploration Geophysicists, P.O. Box 162, 2501 An the Hague, The Netherlands). The design parameter of the new array to produce a desired wideband output signal (dominate frequency of 30 Hz in the range of 8 to 62 Hz) using air guns having identical small chamber volumes (0.65 liters) were:

1. The number of air guns;
2. The spacing between adjacent air guns;
3. The submerged depth of the array;
4. The chamber pressure of each gun. (minimum of 35 bars)

For the desired frequency range the optimum depth (depth below the water surface at which the generated pulse interferes constructively with its sea-surface reflection) 12 meters was calculated. The array was formed on a support frame with 1.2 m and 1.0 m spacing between the seven air guns that were staggered and offset in geometry. The claimed advantages of the new array were an effective point source and enabling continuous monitoring of the near-field pressure pulse.

In 1982, R. J. Johnston published an article entitled "Development of More Efficient Air Gun Arrays: Theory and Experiment, in *Geophysical Prospecting*, Vol. 30, pp 752–773. Noting that seismic source strength of an air gun array may be increase by utilizing higher or greater air pressure, increasing total array chamber volume, adding air guns or improving gun efficiency, the author focused on the latter to minimize air consumption. Further, noting that the marine seismic source strength may be defined as the peak-to-peak (or zero-to-peak) acoustic pressure in a given passband, the signal signature is then proportional to the spectral density of the energy flux (signal strength). The proposed array allegedly employs approximately 40% less air.

"Signature and amplitude of Linear Air Gun Arrays: was the title of an article of J. J. Nooteboom published in *Geophysical Prospecting* 26, pp 194–210 (1978). After reviewing the fundamentals of the signature of a linear air gun array, features of interacting and non-interacting air gun arrays are discussed. The spacing of the air guns can be determined or calculated to prevent interaction. Continuous measurement of the signature is desirable as arrays are measured by far field signals (not near field). However, the specific far field signature as used in this experiment is not suited to use of filters to correct for signal shape. Interaction of air guns is not needed to obtain a high primary-to-bubble ratio, but if interacting guns are used the differences in bubble times between adjacent guns should be proportioned to their bubble times squared.

The article "Attenuation of Coherent Noise in Marine Seismic Exploration Using Very Long Arrays" by B. Ursin was published in *Geophysical Prospecting* Vol. 26, pp. 722–749 (1978). The super long array consisted of five uniformly spaced identical straight line positioned subarrays with each subarray having fire identically chambered air guns with the distance between subarrays ranging between 20 to 56 m. The stated purpose of the super long array is to avoid or attenuate the strong long-period water bottom reflected signals.

An article by Sinclair and Bhattachayra entitled "Interaction Effects in Marine Seismic Source Arrays" published in *Geophysical Prospecting* 28, pp 323–332, focused on a number of seismic signal sources. The calculation presented are for continuous or long duration seismic signals where the sources are all located at a common depth. However, interacting impulsive sources air guns require different criteria for the optimum arrangement of units as the timing of the radiation is affected. This presents a more complex problem, but tends to result in closer spacing of the air guns to dampen undesired bubble pulses. In the far-field, an entirely different spectrum due to wave interference than that of a single gun may be produced. The authors concluded that the interaction is based on the signal wavelength and can be favorably employed in air guns by a close spacing to dampen the bubble pulses. The water surface reflection ghost echoes are also recognized as having an significant important effect on the recorded data.

*Geophysical Prospecting*, Vol. 24, pp 773–787 (1976) contains an article by Safar entitled "Efficient Design of Air-Gun Arrays". A technique for shaping (shortening) the pressure bubble pulse of the identical air gun array by proper spacing or coupling of the guns to overcome the low efficiency and long duration bubble pulse drawbacks is disclosed. The thermal attenuation and acoustical radiation impedance of the signal may be calculated, but the acoustic radiation can be influenced by mutual interaction of the air guns. A properly designed array of identical air guns should be tuned so that the pressure of one bubble acts on the adjacent bubbles. The distance between guns can then be calculated to determine such spacing, but is also influenced by the constant depth of the two interacting guns. The paper concludes that an array of identical air guns for producing a desirable seismic pulse must be mutually coupled. This may be done (dampening resistance) with a wave shape kit for each air gun. Another option to increase the acoustic radiation resistance by gun spacing. A linear array is suggested not the best arrangement for reducing the pressure bubble pulse due to differences of the acoustical radiation resistance of the center gun and the last gun. However, the interacting guns must be placed at a sufficient depth for the bubbles to interact. The author also concludes that a linear array is not the best arrangement for reducing the pressure bubble pulse and suggests a concentric circle arrangement of fifteen air guns. Experiments were also conducted on other arrays of mutually coupled air guns at a depth of 23 meter.

In *Geophysics*, Vol. 48, No. 2, February 1984 an article entitled "The signature of an air gun array" Computation from near-field measurements including interactions—Practical Considerations" by Parker et al was published. The calculation for the near field signature of an interacting air gun array is improved by compensating for movement of the hydrophones and upward motion of the air bubbles. The calculated far-field signature closely matches the measured "far-field" signal.

An article by Ziolkowski, et al entitled "The signature of an air gun array: Computation from near field measurements including interactions: was published in *Geophysics*, Vol. 47, No. 10. October 1982 at pp 1413-1421. The seismic signature of an array of interacting guns may be calculated from the near field measurements using a spherical wave function. Comparison of the calculated and measured signature valves show a close match.

"Extended Arrays for Marine Seismic Acquisition" is an article by Lofthouse and Bennett published in *Geophysics*, Vol 43, No. 1 (February 1976), pp 3-22. The marine arrays of both sources and receivers is designed to attenuate the extremely strong sea-bottom multiples encountered during use. Twenty-Five air guns arranged in five identical in-line subarrays separated between 28 and 55 m is disclosed. Each subarray produces a seismic signal having an acoustical intensity of better than 6 bar meters with a primary-to-bubble ratio of 4.4 when recorded through a 125 Hz filter.

In *Geophysics*, Vol. 48, No. 2, February 1984, Parkes et al published an articles entitled "The signature of an Air Gun Array: Computation From Near-Field Measurements Including Interactions—Practical Consideration". (*Geophysics* is the journal publication of the Society of Exploration Geophysicists, P.O. Box 702740, Tulsa, Okla. 74170-2740). This article discloses a system for calculating or computer modeling the signature of an interacting air gun array from near field measurements.

Also in *Geophysics*, Vol. 47, No. 10 (October 1982) pp 1413-1421 the same authors had presented a similar article entitled "The Signature of an Air Gun Array: Computation from Near-Field Measurements Including Interactions". The interaction effects of the between the air gun bubbles are described in terms of spherical waves and comparison of calculated and measured far field signatures shows a good match.

Lofthouse and Bennett published in *Geophysics*, Vol. 43, No. 1 (February 1978), pp 3-22, an article entitled "Extended Array For Marine Seismic Acquisition". The signal source array comprised 25 air guns arranged in five identical in-line subarrays. Each subarray had a volume of 297 cu. in. producing a signal of 6 bar meters acoustic intensity with a primary-to-bubble ratio of 4.4 (Depth of approximately 8 meters).

The article "Air Gun Source Instabilities" by Dragoset et al was published in *Geophysics*, Vol. 52, No. 9 (September 1987) at pp 1229-1251. Because of the numerous sources of instabilities of air gun arrays, the deconvolution signature may change sufficiently over time to adversely affect proper interpretation of the collected data. For this reason, compensating removal of such changing source effects from the seismic data prior to processing is desirable. The paper analyzes the effect of various types of instabilities of the source signal array on the acquired data.

The standard or benchmark rectangular shaped, constant depth (two dimensional) air gun array evaluated employed a plurality of 10 different volume individual guns arranged in two parallel, towed streamers forming gun lines (6.1 m spacing) of 5 guns with 2.4 m spacing between guns in each line. The residual array signature (after standard signature deconvolution is applied) indicates minimum variation due to air gun instabilities.

The Vol. 44, No. 5 (May 1979) pp 865-879 issue of *Geophysics* contained an article by Brandsaeter, et al, entitled "A New High-Resolution Or Deep Penetration Air Gun Array". As deep penetrating seismic source signals are at the low end of the useable frequency range (0-90 Hz), the objectives of deep penetration and high resolution provide conflicting source array design requirements. The compromise arrays employed and 4 streamers were run at water depths of 5 to 12 meters. The array consisted of 21 guns with an array total volume of 4165 cu. inches at 2000 psi with one gun having a volume of 1645 cu. inches. A port side streamer was an inline string of 7 guns and a second port side streamer was frame point source mounting 6 equi-spaced guns. To starboard was a single big gun (1645 cu. in.) streamer and a streamer of a point source frame mounting seven guns.

"Some Geometric Aspects of Towed Air Gun Arrays" was a subject of a paper (OTC 4254) published by Teer et al at the May 1982 Offshore Technology Conference (OTC) in Houston, Tex. (The offices of the Offshore Technology Conference are at 6200 North Central Expressway, Drawer 64705, Dallas, Tex. 75206) The paper examines the source signal profile for each then commercially available air gun. The author concludes that an air gun array (of different size guns) yields an enhanced initial pulse and a reduced bubble pulse, but provides no control over the air-water (surface) reflection at a 20 foot nominal depth.

At the May 1974 OTC, John Kologinczak published a paper (OTC 2020) entitled "STAGARAY System Improves Primary Pulse/Bubble Ratio in Marine Exploration". The STAGARAY is a seven gun towed array (computer modeled) using air guns with a wave shape kit that is "tuned" to provide maximum attenuation of reflected and bubble oscillation signals over a broad spectrum of frequencies. It was determined that with more than 7 air guns little advantage bubble pulse attenuation could be gained.

Roy Johnston published at the May 1982 OTC an article (OTC 4255) entitled "Marine Seismic Energy Source: Acoustic Performance Comparison" that contains an informative history of air gun development plus defining a number of terms of the art. Super long (SLAG) and super wide array (SWAG) arrangements of tuned subarrays were tested along with a 6 gun (2 parallel lines of 3 guns source air gun array.

"Application of Air Gun Source for Offshore Seismic Work" is the title of a publication (OTC 2413) by Hans Edelman presented at the May 1976 OTC in Houston. A U-shaped tuned array (24 liter) of five guns (geometry not disclosed) was employed to attenuate the secondary bubble oscillation effects in output frequency range of 0 and 100 Hz.

In May of 1984, Bill Dragoset presented at the OTC a publication (OTC 4783) entitled "A Comprehensive Method for evaluating the Design of Air Guns and Air Gun Arrays". The significant interaction of air guns in an array to form the signature is theoretically developed with the resulting criteria more complex than just spacing or separation of the guns. The relative amplitude of the static water pressure and cumulative interaction pressure field are suggested as additional criteria. The author concluded that the signature of an air gun array depends on many factors of which array geometry and spacing is only two. The modeled array employed 14 guns (980 cu. in total volume) arranged in parallel lines of seven guns staggered or offset in distance from towing vessel. The calculated signature agrees closely with the measured actual far field signature.

"The Versatility of Sleeve Guns as Marine Acoustic Sources" was the title of a publication (OTC 4859) by W. R. Cotton presented at the May 1985 OTC. This article focused on the broader band, higher output advantages of a commercially available external sleeve air gun as a seismic signal source that can be used is easily modified arrays. Bubble condensing clusters of small guns were employed because of their greater efficiency, but array "tuning" required a sufficient number of gun of different chamber volumes in the array. The basic array, tuned on the octave principle, employed 17 air guns (10, 20 and 40 cu. in. in chamber volume) having a total volume of 380 cu. in. and having a 30 ft. in length. Far field signature tests made at three depth showed a noticeable improvement in primary signal output.

R. L. Roark presented at the May 1976 OTC in Houston a paper (OTC 2514) entitled "A Versatile Energy Source Control System for Seismic Exploration Applications". The disclosed controlled array was a triangular arrangement of 7 guns at a common depth with the triangle apex directed toward the towing vessel. The air gun firing controls and other support and control operations of the air gun array were detailed.

"A Modern Marine Seismic System" is the title of a publication (OTC 2021) presented by Pulju et al at the May 1974 OTC. As the primary focus was on deep data acquisition, the seismic signal source was identified as a tuned array four strings of containing 22 Bolt manufactured air guns varying in size from 30 to 300 cu. in.

At the May 1975 OTC, a publication (OTC 2177) by Burt et al entitled "The Mini Spread" was presented. The problem addressed in this paper was the long offset of the data acquisition string and the source array. The "mini-spread" of hydrophones is used to define the sea floor and very shallow reflections during normal seismic operations.

"Seismic Signatures of Air Guns" is the title of an article by Mayne and Quay published at the May 1970 OTC. This paper (OTC 1207), published relatively early in the development of air guns, is helpful in understanding air gun operation and characteristics of their seismic signal. Running depth changes were observed which indicated that the initial pulse did not change significantly with depth, but a marked change in bubble pulse behavior was noted. By firing vertically disposed guns (20 and 30 foot depths simultaneously) the amplitude of the initial pulse will be double while the later bubble pulse signals tend to normalize or cancel each other out. A depth ratio of about 1.5 to 1.0 is required between guns of a vertical array to provide optimum attenuation. Vertically spaced air guns will improve the "signal-to-noise" ratio, but as depth increases so does the "bubble" effects. A specific modified gun (unipulse) was developed to eliminate the "bubble" pulse to maintain the power level in the low frequency energy range.

At the May 1977 OTC, a paper (OTC 2783) authored by Lauhoff et al entitled "Maintaining Three-Dimensional integrity of a tuned Source Array" was presented. In an array of air guns the magnitude of the peak pressure of the seismic signal can be increased proportionally to the cube root if the guns do not interact. The disclosed array employed utilizes seven guns in a triangular arrangement at a depth of 25 feet. By using modified conventional air guns of different chamber sizes the later bubble signals can be attenuated. Signal variations of the change in depth of one gun of the array were measured for providing a far field signature correction used in the deconvolution process.

In the October 1984 edition (pp 52–61) of *Geophysics: The Leading Edge of Exploration* (Published by and for the same society publishing *Geophysics*), William Dragoset published an article entitled "A Comprehensive Method For Evaluating The Design Of Air Guns And Air Gun Arrays". The analyzed array consisted of 14 air guns arranged in two parallel lines of 7 guns with the guns in one line staggered from the other line. Signatures of the array were computer modeled by blending theoretical calculations and measured far field signatures for various depths (10 to 35 ft) to determine effects on the energy output. From this data it was determined that the array seismic signal energy output at the deeper depths was dramatic but only for certain frequencies. It was then concluded that for deep depth penetration of the earth formations, the arrays should not be tuned to produce high primary-to-bubble (PBR's) ratios but to maximize power at deeper depths within the frequency band of interest.

Other abstracts of articles of some interest from *Geophysics* include the following:

HWG 400 Water Gun: A New Step Toward Power and Resolution, J. P. Fail.

"Directivity and other characteristics of a wide air gun array system", Parkes, Hatton and Haughland, presented at the Society of Exploration Geophysicists meeting in Los Angeles, Calif. in October 1981. A seven gun subarray was used as the basic building block.

"Three-Dimensional Air Gun Arrays", Smith 1984 Marine II 1984. This paper focuses on increasing the array efficiency of the air guns (source strength per amount of air used) when disposed in the third or vertical dimension. The arrays employed were long (25 meters of 17 guns) on both the port and starbound sides. Both uniform and non uniform (coalesced) spacing of the different chamber size air guns on each side was employed. The timing of the gun firing was sequenced to achieve in phase summation of the primary output signal. The four subarrays of 19 m. length were towed at depths of 5.4 to 11.0 meters with a sequenced firing time range of 0 to 3.75 ms.

SUMMARY OF THE PRESENT INVENTION

A new and improved high resolution marine seismic signal point source formed by an array of identical size air guns which generate a powerful broad band pulse which is largely free of bubble pulse oscillations due to the array design. The depth of the horizontally disposed air guns below the water surface is 1 to 3 meters. The guns are arranged in a 2×4×2 configuration providing a tapered, heavy center, point source. This arrangement provides high resolution and good penetration for relatively shallow targets located 2.0 to 3.0 seconds below the ocean floor or bottom mud line (BML).

In one embodiment, the array is formed by a plurality of eight conventional air guns of 10 cu. in chamber volume each of which are suspended in a horizontal posture from a support frame. The power output of the seismic signal formed by the array (80 cu. in gun volume) is 10 bar-meters peak to peak which is achieved in less than 1.0 milliseconds.

If an even higher frequency seismic signal content is desired for delineation of very fine subsurface structures, 4 cu. in. chamber volume air guns may be substituted for the 10 cu. in. guns in the array. Power output in this embodiment or configuration is approximately 7.1 peak to peak bar meters with usable data acquisitions in frequencies as high as 1 KHz.

TERMS DESCRIBED

Certain terms, as used herein, will be understood to have the conventional meaning described below, unless the context of their description indicate a specialized meaning.

Signature of Single Air Gun

Generally, the signature or a single air gun output or seismic signal depends on the four following factors:
1. The gun depth in the water;
2. The initial pressure of the compressed air charge;
3. The volume of the air gun firing chamber; and
4. The mechanical design of the gun including port size and port open time.

In general, a single air gun is an unsuitable seismic signal source due to its low efficiency or energy and long pressure bubble pulse.

Signature of an Airgun Array

The signature of an air gun array can be determined by either field experiments (far field signature test measurements) or theoretical (computer model calculations).

Conventionally, the calculated signature of the air gun array is a simple linear superposition of the individual gun signature at the first level of approximation. Next, correction or other assumptions are made for bubble interaction for spherical divergence, travel-time delays, bubble interaction, etc. to form a calculated signature of the array. The appropriateness of the calculated array signature is then conventionally evaluated by comparing with measured near or far field array signatures.

The signature of an air gun array seismic signal depends on many factors including:
1. The range of individual gun volumes in the array;
2. The array geometry;
3. The gun firing synchronization;
4. The direction of observation relative to the array; and
5. Depth of guns below surface.

Precise determining of the signature of an air gun array is essential and critical for processing the data obtained during a marine seismic survey. During deconvolution the signature may be used to design a filter to modify the recorded data.

Secondary Effects

Secondary effects on air gun seismic signals include both water surface reflection and bubble oscillation. The bubble oscillation secondary effect can be suppressed by a number of techniques, including:
1. Locating the air guns in the array in close proximity to interact the output bubbles;
2. Modifying the air guns output ports with so called wave shaped selectors;
3. Positioning the air guns in cages; and
4. Using air guns of different chamber size in an array.

The first three techniques listed immediately above result in an undesired decrease of the primary pressure pulse with moderate bubble suppression. The fourth technique gives good bubble suppression by destructive interference of individual bubbles without power or energy loss of the primary pressure pulse.

Bubble interaction has been the subject of much research for predicting the tail or secondary effects of a seismic signal. Identical factors involved bubble interaction includes:
1. Separation or spacing of the guns;
2. Relative amplitude of the static water pressure (depth); and
3. Cumulative pressures in the interaction field or zone.

Water surface-reflected (ghost) seismic signal pressure waves are also a source of error in the recorded seismic signals. While deeper run air gun arrays produce more energy at the lower frequencies to enhance very deep seismic sections, the ghost echoes and bubble oscillation secondary effects are enhanced.

Primary to Bubble Ratio (PBR)

The ratio of the primary seismic signal to the secondary or bubble generated is a significant characteristic or indicator of a seismic source signal. Generally, the larger the ratio the better. Achieving the desired ratio of the primary signal with the secondary effects in a desired frequency range can result in loss of seismic signal strength. Accordingly, some compromise between primary signal strength and the primary to bubble ratio is normally accepted in array design. Generally, this is achieved by "tuning" the array by using air guns of different chamber volume on an octave principal to obtain a broad band frequency output signal in the desired range.

Description of the Preferred Embodiment

Figure 1:
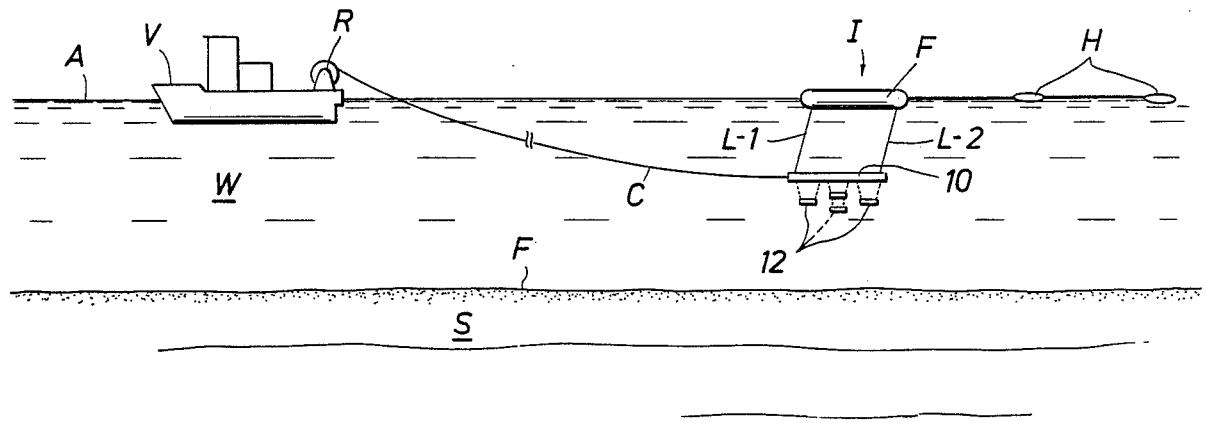
FIG. 1 is a schematic side view, in section, of a floating vessel towing the marine seismic signal source of the present invention in an environment of use.

A typical use of the Method and Apparatus for Seismic Exploration of the present invention, generally designated I, is schematically illustrated in FIG. 1. A suitable buoyant, self propelled, marine seismic vessel V floats in a body of water W disposed above the water floor formed by the sea bed, bottom mud line (bml) or earth outer crust F. Below the water floor is located the subsurface formation S to be investigated by conventional seismic exploration techniques using the method and apparatus of the present invention I. The air-water interface is formed or defined by the upper water surface A. This is a typical or conventional offshore marine environment found in bays, oceans, gulfs and the like but it will be understood that the present invention may be used in any marine environment such as rivers, swamps, marshes, etc.

Mounted on the floating vessel V is the conventional support equipment for handling, remotely operating and transporting the apparatus I of the present invention. Such suitable support equipment and its use and operation is well known to those skilled in the art and need not be set forth in detail. During conventional seismic exploration operations, the vessel V will also pull or tow a suitable array of seismic signal receivers, transducers or hydrophones H for receiving the returned seismic signal information or data from the subsurface formation. Such transduced signals are transmitted from the hydrophones H to the vessel V by a known umbilical linkage in the usual and conventional manner for recording, monitoring, observation, etc.

During use the marine seismic signal source apparatus of the present invention I is also disposed and towed behind the marine Vessel V, but preferably at a closer or shorter distance from the vessel V than the hydrophones H. In the illustrated embodiment a towing and control cable umbilical harness or apparatus C extends between the apparatus of the present invention I and a conventional harness take up or handling reel R mounted on the vessel. The cable apparatus C includes the towing cable or structural member as well as the conventional umbilical means for gun firing control and high pressure air supply conduits to the apparatus I. Both the remote control gun firing means and high pressure air supply means (not illustrated) are conventional and located on the vessel V and operably connected by the cable apparatus C to the present invention I. The umbilical cable apparatus C is also well known to those skilled in the art and need not be described in detail.

The apparatus of the present invention I for producing a seismic signal in a marine environment is illustrated in detail in FIGS. 2–5. The apparatus includes a support frame, generally designated 10, operably mounting a plurality of eight air guns 12 for forming a desired seismic signal source array. As the eight air guns are identical and of conventional, commercially available types they will not be described in detail or individually.

Figure 4:
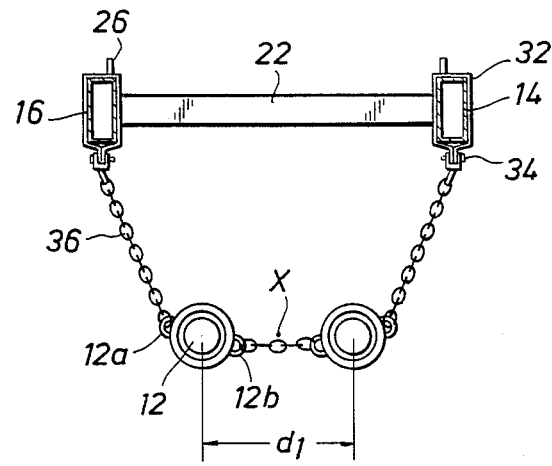
FIG. 4 is a view taken along line 4—4 of FIG. 2.
Figure 5:
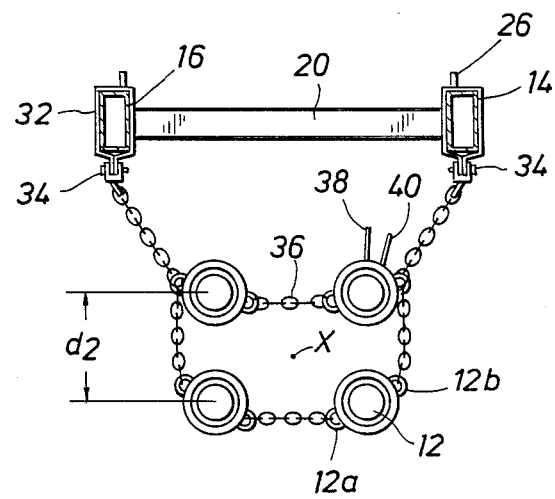
FIG. 5 is a view taken along line 5—5 of FIG. 2.

The support frame 10 may be formed of any desired configuration or shape, but for convenience a rectangular frame 10 having longitudinally extending side members 14 and 16 connected by longitudinally spaced parallel cross braces 18, 20, 22 and 24 is preferred. Any desired manner of construction may be employed for such as welding, riveting, etc. but for ease of assembly and transportation a bolted construction of conventional steel beam structural members is preferred. As best shown in FIG. 4 and 5, conventional rectangular cross section hollow tubular structural steel members that are readily available commercially is the preferred material of construction or fabrication. After fabrication a suitable protective coating is applied to the frame 10 to retard corrosion of the support frame 10.

The precise arrangement of the four frame cross members 18, 20, 22 & 24 is also not critical, but preferred for strength, weight and flexibility purposes. The illustrated bolting arrangement for securing the cross members 18, 20, 22 and 24 with the side members 14 and 16 and provides for rapid assembly and disassembly as well as ease and convenience of transportation.

Secured (preferably by welding) to the upper side of the frame assembly 10, preferably on each of the side members 14 and 16, are a plurality of attachment fittings 26 which provide suitable means for securing with the frame 10. The number of the plurality of fitting 26 should be sufficiently large to accommodate planned and unanticipated needs for attachment to the frame during use, handling and transportation. The size and shape details of the plurality of attachment members 26 are not critical and should be considered as typical.

Figure 3:
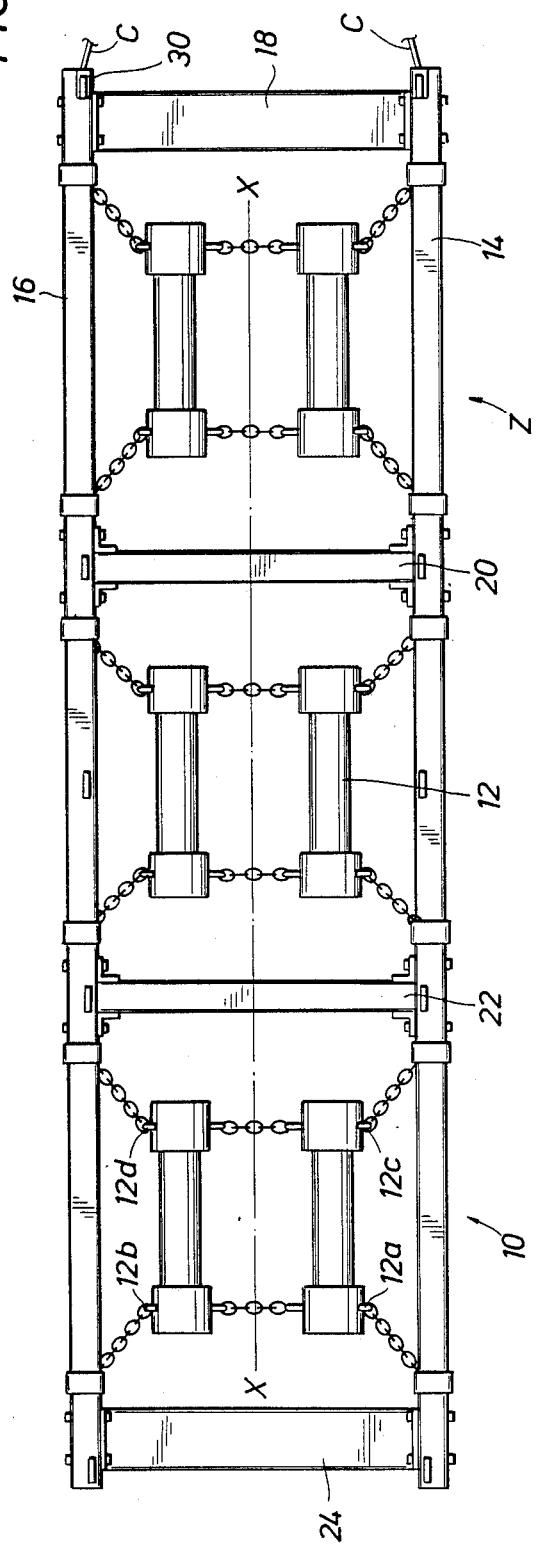
FIG. 3 is a top view of the marine seismic signal source of the present invention.

Each of the attachment fittings 26 is provided with a hole or opening 28 for receiving a connection bolt of a conventional end fitting secured to one end of an attachment chain or line, such as the Y or yoke fittings 30 at the end of the towing cable apparatus C (FIG. 3). The attachment fittings 26 thus provide means for securing said support frame 10 to the towing cable apparatus C extending from the marine vessel V for pulling or moving the support frame 10 through the water W in the conventional manner. Of course many other means or arrangements for securing the support frame 10 to the towing cable apparatus C will be apparent to those skilled in the art.

The attachment fittings 26 also function to assist in locating the frame 10 at a desired depth in the water W below the air-water interface or water surface A. A suitable buoyant frame support or float F (FIG. 1) has mounted thereon a plurality of chains, cables or support lines L-1 and L-2 which extend downwardly into the water for attachment to the frame 10 using attachment fitting 26. The length of the line L-1 and L-2 determine the depth of the frame 10 and mounted air guns 12 below the water surface A. Preferably the air guns 12 are disposed at a relatively shallow depth of 1 to 3 meters below the air-water interface A to minimize reflection of ghost echoes and bubble pulsation.

Means for operably mounting each of the plurality of air guns 12 with the support frame 10 are also provided. Preferably a plurality of identical longitudinally split generally rectangular shaped adjustable clamps 32 are provide for this purpose. Other known means for performing this function, such as fittings 26, may be employed by those skilled in the art. However, the clamps 32, best illustrated in FIGS. 4 and 5, are preferred as their secured position along side members 14 and 16 may be quickly adjusted as desired. Suitable bolting 34 is used to releasably tightly secure the surrounding clamps 32 to frame members 14 and 16 and may also be used to attach the chains, cables or the like mounting the air guns 12. While a chain arrangement, generally designated 36, is preferred for mounting the air guns 12 to the clamps 32, many other desired mounting arrangements will be apparent to those skilled in the art. The chain arrangement 36 is preferred because of the flexibility and ease of installation, adjustment and maintenance.

As best illustrated in FIGS. 4 and 5, each of the identical, cylindrical shaped conventional air guns 12 have a pair of attachment lugs 12a and 12b formed thereon at one end for attachment to the plurality of chain lengths forming the chain arrangement 36 used to secure the air guns 12 with the frame 10 and with each other. Each of the plurality of air guns 12 forming the array are preferably identical in construction and having a uniform gun chamber volume. For this reason, the location of the air guns 12 in the array Z is interchangeable. Preferably, the identical air guns 12 are the Texas Instruments sleeve gun which have been commercially available from that company since 1985.

Figure 2:
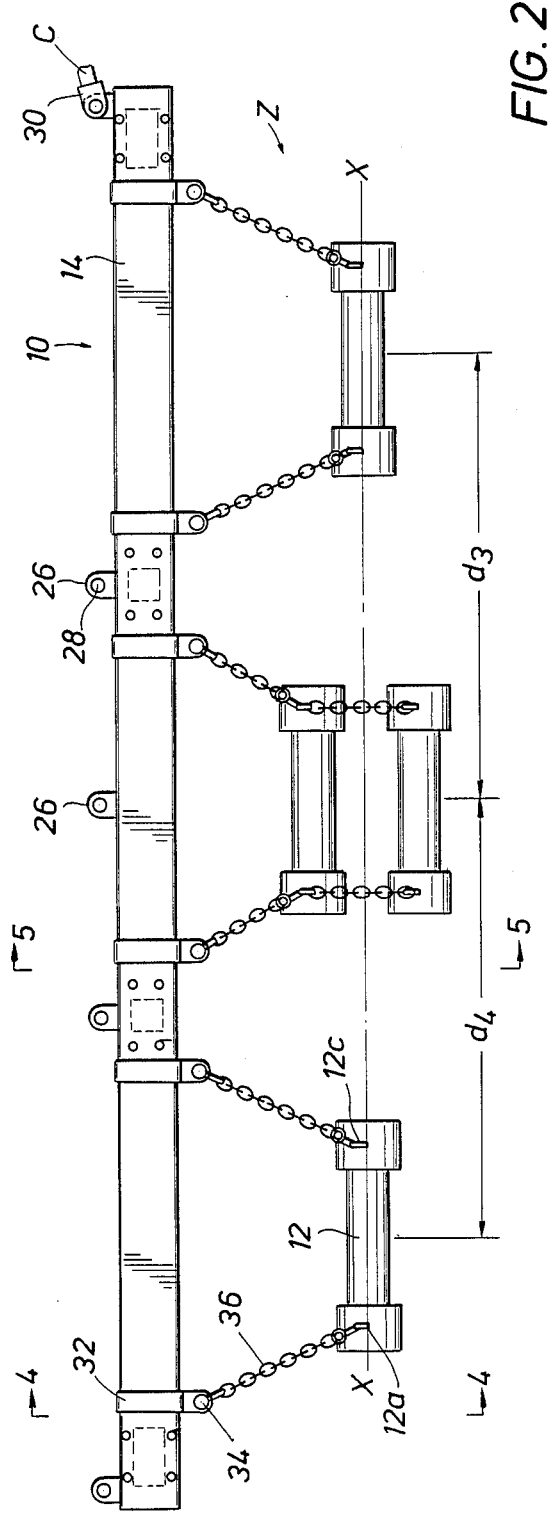
FIG. 2 is a side view of the marine seismic signal source of the present invention.

As best illustrated in FIGS. 2 and 3 the other end of each air gun 12 is provided with a similar pair of attachment lugs 12c and 12d to maintain each of the air guns 12 horizontally disposed and in a relatively fixed position to each other to form the desired air gun source array Z during normal operation. As illustrated schematically in FIG. 5, each of the air guns 12 is operably connected to the umbilical of the cable apparatus C by conduits 38 and 40 for providing gun firing signals and a continuous supply of high pressure air to each of the guns 12 in the known manner.

The plurality of eight (8) air guns 12 are located on the frame 10 in a paired 2×4×2 arrangement to form the desired array Z. For purposes of describing the geometric arrangement of the array Z a longitudinal axis X—X as illustrate in FIGS. 2 and 3 will be used as a reference axis although the geometric relationship of the guns 12 forming array Z may be described from any other desired positional references. The axis X—X is preferably aligned with and maintained in the same direction of travel as the vessel V, but may be offset to either the port or starboard side of the vessel V for paralleling the direction of vessel travel. As also shown in FIGS. 2 and 3, the strength, stress or towing line of the cable apparatus C is preferably connected to the attachment fitting 26 adjacent the front cross member 18 by a conventional bridle or yoke 30. In this arrangement, the cross brace 24 becomes the rear member relative to the direction of frame travel. If desired this arrangement may be reversed with cross brace 24 becoming the front member of the frame 10.

As illustrated in FIGS. 2 and 4, a pair or two of the plurality of air guns 12 are operably mounted with the frame 10 between the first or front cross member 18 and the second or intermediate cross member 20 and secured at a common distance below the frame 10. As also illustrated in FIG. 3, the array geometry or layout of the two identical air guns 12 mounted between the third cross member 22 and the fourth or rear cross member 24 is identical to that of the air guns 12 located between cross members 18 and 22. The longitudinal axis of each of these four cylindrical air guns 12, lies in the same horizontal plane as the longitudinal axis X—X (FIG. 2). The depth of this horizontal plane below the water surface A is determined by the chain arrangement 36 and length of lines L-1 and L-2 and is in the shallow range of 1 to 3 meters.

The longitudinal axis of the two paired outside air guns 12 adjacent to end cross braces 18 and 24 on each side of axis X—X are also aligned (FIG. 3). This aligned longitudinal axis of the air guns 12 is also parallel to the axis X—X with the paired air guns 12 disposed on opposite sides and equidistant from the longitudinal axis X—X. The horizontal width distance or spacing between the center or longitudinal axis of these pairs of air guns 12 is shown in FIG. 4 as $d_1$ and with the equidistant spacing of each gun from the longitudinal axis X—X being $d_1/2$.

As best illustrated in FIGS. 3 and 5, the plurality of four air guns 12 mounted between the cross members 20 and 22 have the same paired horizontal width relationship ($d_1$) as the outside paired air guns 12 between cross braces 18 and 20 and cross braces 22 and 24. However, as shown in FIGS. 2 and 5 the four centered air guns 12 between cross braces 20 and 22 do not line in the horizontal plane formed by the longitudinal axis X—X. Instead they are spaced or positioned a uniform or equal distance above or below the horizontal plane passing through axis X—X as will be appreciated from the cross-sectional view of FIG. 5. This arrangement may be described as a horizontal pairing of air guns 12 with one pair disposed above axis X—X and another pair located below the axis X—X. This arrangement may also be described as pairs of air guns 12 disposed in vertical planes on opposite sides of the axis X—X, but the actual geometric arrangement is identical in both descriptions.

The vertical plane spacing or distance between the air guns 12 mounted between cross member 20 and 22 is shown as distance $d_2$ (FIG. 5) and with the air gun spacing above and below the horizontal plane defined by the longitudinal axis X—X being half of the distance $d_2$ or $d_2/2$.

As best illustrated in FIG. 3, the location of the air guns 12 results in a geometric arrangement in which the longitudinal axis of each of the four cylindrical air guns 12 on one side of the longitudinal axis X—X of the array Z are positioned in a common vertical plane (not referenced) while the plurality of four air guns 12 located on the other side of axis X—X are disposed in another common vertical plane (also unreferenced). The horizontal distance between these two unreferenced vertical planes is also defined by $d_1$ and with the equidistant spacing from a vertical plane passing through axis X—X being $d_1/2$.

The longitudinal spacing or horizontal length distance between the centers of the plurality of air guns 12 forming the array Z are shown in FIGS. 2 and 3. The horizontal distance between the geometric center of air guns between cross frame members 18 and 20 and frame members 20 and 22 is referenced as $d_3$ while that of the air guns 12 between frame members 20 and 22 and frames 22 and 24 is shown as dimension $d_4$. Preferably the distances $d_3$ and $d_4$ are the same or equal so that the air guns 12 adjacent outer frames 18 and 24 are the same uniform distance from the two air guns 12 pairs located between cross braces 20 and 22. This provides a 2×4×2 geometric arrangement of the array Z giving the characteristics of a tapered, heavy center, point source.

The following array dimensions are preferably employed:

$d_1$ = 20 in.
$d_2$ = 20 in.
$d_3$ = 5 ft.
$d_4$ = 5 ft.

These dimension result in a compact array Z configuration that may be easily towed and handled.

The chamber volume or size of the individual air guns 12 forming the array Z may be selected as desired. Contrary to known tuned arrays, the chamber volume of the air guns are identical in size. In accordance with the present invention, the plurality of eight air guns 12 are provided with common or uniform size firing chambers ranging in size from 4 cu. in. to 10 cu. in. each. Air guns 12 having two common chamber sizes or volumes have been found well suited and are preferred for use in this array configuration. If 10 cu. in. chambered air guns 12 are employed an array total chamber volume of 80 cu. in. results. If higher frequency content of the seismic output signal of the array Z is desired such as for delineation of fine structures (such as an engineering survey) the same array geometry and dimensions are maintained. However, the chamber volume of each of the 8 air guns 12 is reduced to 4 cu. in. to reduce the array total volume to 32 cu. in. This provides a preferred total chamber volume range for the array Z of 32 cu. in. to 80 cu. in. In utilizing the present invention, those skilled in the art may utilize a total chamber volume of greater than 80 cu. in. if desired.

Figure 6:
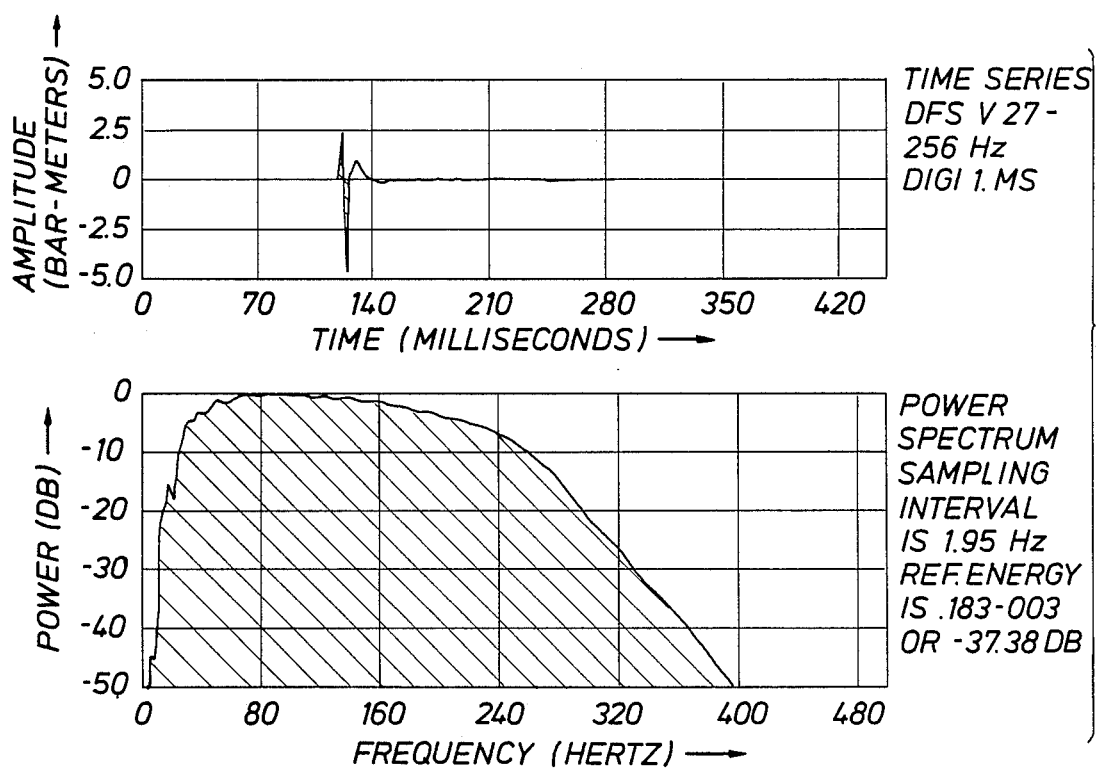
FIG. 6–9 are conventional representation of the characteristics of the seismic output signals provided by the marine seismic signal source of the present invention.
Figure 7:
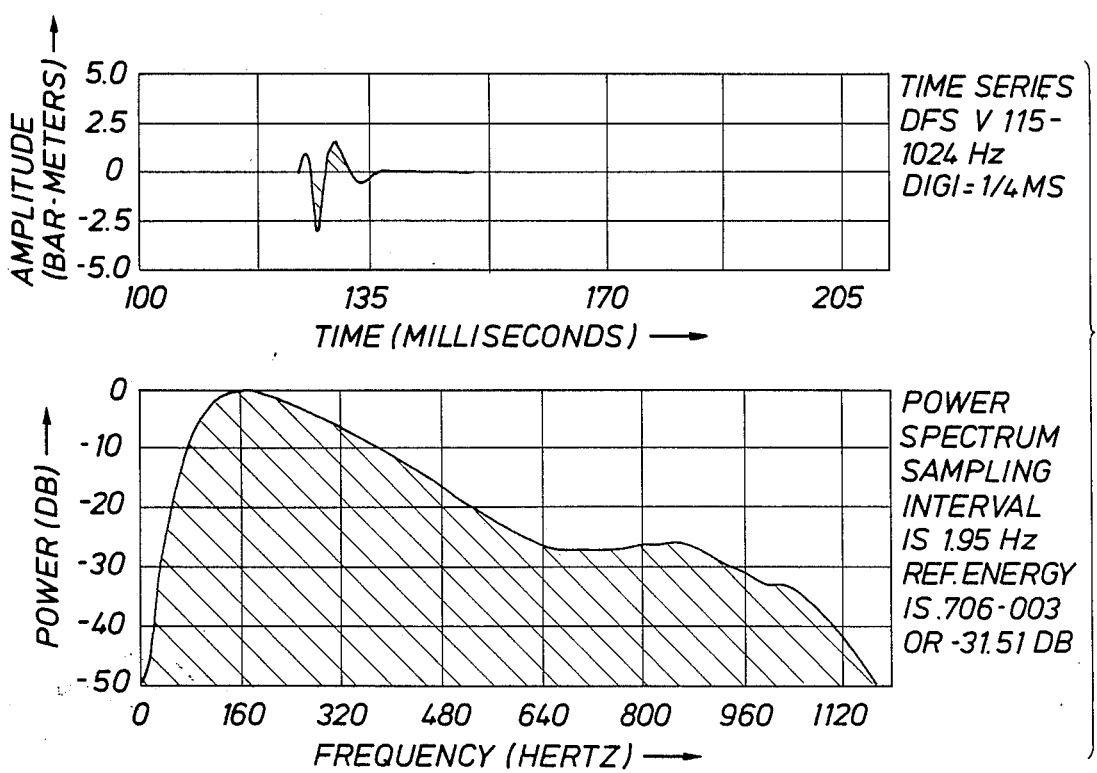
Figure 8:
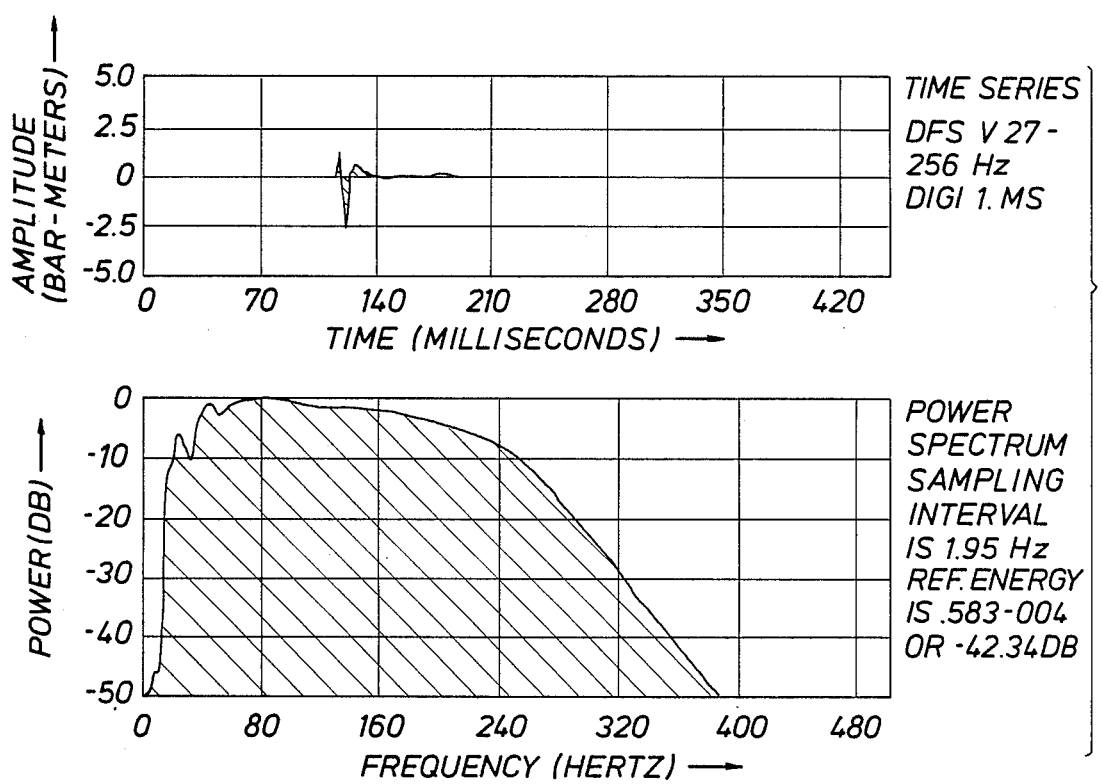
Figure 9:
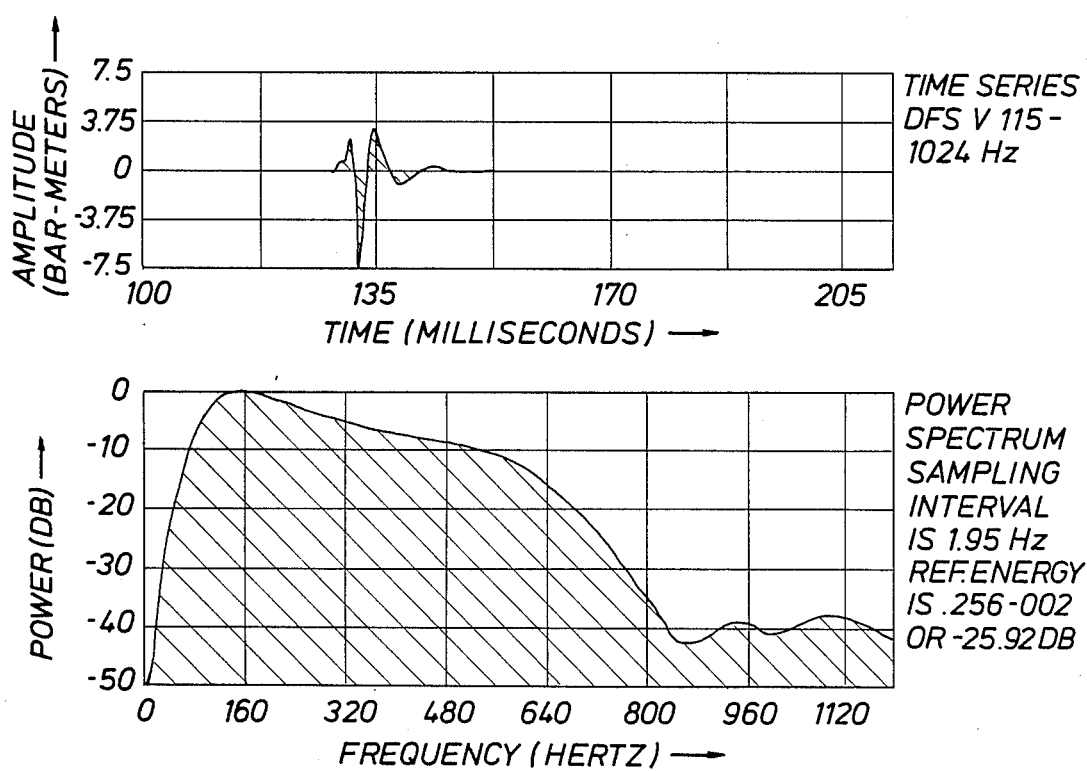

The measured far field signature of the marine seismic signal source of the present invention I when deployed in the array Z and all eight air guns 12 are timed to fire substantially simultaneously are shown in FIGS. 6-9. This data was recorded on a Texas Instruments recorder model DFS V configured in the dual sample mode. Data was acquired at a normal survey speed of 4 knots in water having an approximate depth of 1000 ft. The data sampling and recording was done over different time intervals with different frequencies of interest. The 1.0 msec (millisecond) sample data (FIGS. 6 and 8) has a low-cut or limit filter of 27 Hz and a high cut or limit filter of 256 Hz. The 0.25 msec sample data (FIGS. 7 and 9) has a low cut filter or limit of 115 Hz and a high cut filter of 1024 Hz. The 80 cu. in. total chamber volume array Z measured far field signature is illustrated in FIGS. 6 and 9 while the measured 32 cu. in. chamber volume array Z signature is shown in FIGS. 7 and 8.

Conventional descriptions of source waveform characteristics include (1) a far-field time domain waveform as recorded over some broad frequency band, (2) the strength (in bar-m) computed from the peak-to-trough amplitude of the primary pulse, (3) the ratio of that strength to that of the first bubble pulse, and (4) a power spectrum of the waveform. None of these descriptors when used uncritically is a sufficient characterization of the pertinent seismic properties of a source. For example, although the primary-to-bubble amplitude ratio may be as large as ten over a broad frequency band, it can approach one over the lower frequency bands (such as 8 to 40 Hz) typical of deeper reflections. Examining the air gun array signatures through different narrow passband filters provides relevant insights into the quality of array tuning and graphically demonstrates basic principles of tuned array design.

It will be understood and appreciated to those skilled in the art that the actual out seismic signal of the 80 cu. in. total firing chamber volume array shown in FIGS. 6 and 9 is in fact the same or identical signal while the measured characteristics of the signal appears to differ due to different data or information displayed. In FIG. 6, the signal was measured or digitized a 1.0 msec interval and frequency range of the low frequency filter was set at 27 Hz while the upper filter was at 256 Hz. In FIG. 9, the same 80 cu. in. total chamber volume array output signal was measured or digitized at 0.25 or ¼ msec intervals and a low frequency filter of 115 Hz was employed with the upper filter set at 1024 Hz. For high resolution, shallow surveys, these are both desired ranges of data acquisition.

In both FIGS. 6 and 9, the upper graph illustrates the signal amplitude (expressed in bar-meters) plotted against time while the lower graph plots the relative power (in decibels) against frequency (in Hertz or cycles per second). From FIGS. 6-9, it will be appreciated that the primary rise time for peak pressure is less than 1.0 milliseconds (msec) and signature repeatability is excellent with gun synchronization of ±300 microseconds for the 80 cu. in. embodiment of the array Z.

Focusing on FIG. 6, and in particular the upper graph, it will be recognized that power output of the primary pulse of the 80 cu. in. volume array is approximately 7.1 bar meters peak to peak. The secondary effects or bubble pulse signal produces a relatively weak signal of 1.1 bar meters producing a relatively high primary to bubble ratio of 6.45.

The lower graph of FIG. 6 shows that in the frequency range of interest (27 to 256 Hertz) the signal power will not be less than minus 20 decibels relative to peak energy. With 1.0 msec digitizing or sampling of the seismic data a high resolution signal for shallow seismic targets located in the strata S at a depth of 2.0 to 3.0 seconds below the floor or mud line is obtained.

The measured signal differences of the 32 cu. in. total chamber volume array Z between FIGS. 7 and 8 also reside primarily in the sampling interval and band limiting filters to which the data is subjected, since the actual seismic signal is the same. As best shown in FIG. 8, the rise time for the primary signal pulse of the 32 cu. in. embodiment is less than 1.0 msec with a peak to peak pulse of approximately 4.0 bar-meters. The secondary or bubble pulse is approximately 1.0 bar-meters for providing a primary to bubble ratio of 4.0.

The lower graph or signal plot of FIG. 7 shows that in the frequency range of interest (115 to 1024 Hertz) that to minimum relative power was never less than −15 db.

In FIG. 8, the low and high filters employed were 27 and 256 Hertz, respectively. The rise time for the primary pulse is again less than 1 msec and the primary signal is approximately 4.0 Bar Meters (upper graph). The bubble signal is approximately 1.0 Bar Meters giving a primary to bubble ratio of 4.0. The minimum signal power in the 27 to 256 Hertz range (lower graph) never falls below 42 decibels.

Use and Operation

In the use and operation of the present invention, the support frame 10 is assembled in the manner illustrated. The cylindrical air guns 12 are operably mounted with the frame 10 using the chain assembly in the array Z configuration illustrated. The plurality of air guns 12 are preferably disposed so that the longitudinal axis of each of the generally cylindrical air guns 12 is in a generally horizontal orientation for operation when the float F is connected for seismic operation. The cable apparatus C is the operably attached to the support frame 10 in a desired manner for towing and the individual air guns 12 operably connected to the air supply and firing controls. The assembled apparatus I is then placed in the body of water W with the eight identical air guns 12 positioned in a horizontal orientation at a depth of 1 to 3 meters below the water surface A.

The eight identical air guns 12 are mounted with the support frame 10 to provide a point source array Z having the geometry and spacing illustrated and described. This 2×4×2 air gun configuration provides a tapered heavy center output seismic signal. When the seismic signal source apparatus I is at a desired predetermined distance from the vessel V towing commences.

When it is desired to conduct a seismic survey, firing signals are transmitted from the vessel V through the cable apparatus C to fire the air guns 12. Preferably the air guns 12 are timed to fire substantially simultaneously in order that the output energy of each gun occurs concurrently to enhance and maximize total peak energy output of the array Z. Normally the simultaneous firing sequence for all air guns 12 in the array Z is achieved with a tolerance of ±300 msecs.

The foregoing disclosure and description of the invention are illustrative and explanatory thereof, and various changes in size, shape and materials, as well as in the details of the illustrated construction, may be made without departing from the spirit of the invention.

What is claimed is:

1. An apparatus for producing a seismic signal in a marine environment when towed behind a vessel and located below the surface of a body of water, including:

a support frame;

means for securing said support frame to a towing line from the vessel;

means for locating said support frame at a desired depth in the range of 1 to 3 meters below the water surface;

a plurality of air guns; and means for operably mounting each of said air guns with said support frame for forming an array providing a tapered, heavy center, point source seismic signal when the air guns are discharged.

2. The apparatus as set forth in claim 1 wherein;

said plurality of air guns including eight air guns mounted on said frame in pairs to form an array having a 2×4×2 configuration.

3. The apparatus as set forth in claim 2, wherein:

each of said plurality of air guns having a firing chamber volume of substantially 10 cubic inches.

4. The apparatus as set forth in claim 2, wherein:

each of said plurality of air guns having a firing chamber volume of substantially 4 cubic inches.

5. The apparatus as set forth in claim 2, wherein each of said plurality of air guns having a firing chamber volume in the range of 4 to 10 cubic inches.

6. The apparatus as set forth in claim 1, wherein:

said plurality of air guns forming said array arrange on said support frame in two parallel vertical planes with each vertical plane axis having four air guns disposed therein.

7. The apparatus as set forth in claim 6 wherein:

the horizontal spacing between said two parallel planes forming said array is a distance of substantially 20 in.

8. The apparatus as set forth in claim 6, wherein each of said vertical planes having positioned therein a first air gun and a second air gun with said first and second air guns space apart a distance of substantially 10 feet in a horizontal plane containing said first and second air guns.

9. The apparatus as set forth in claim 1 wherein:

each of said plurality of air guns having a generally cylindrical shape for forming a longitudinal axis, each of said longitudinal axis of said air guns is disposed in substantially a horizontal orientation when said air gun is operably mounted with said support frame.

10. An apparatus for producing a seismic signal in a marine environment when towed behind a vessel and located below the surface of a body of water, including:

a support frame;

means for securing said support frame to a towing line from the vessel;

means for locating said support frame at a desired depth in the range of 1 to 3 meters below the water surface;

a plurality of air guns;

means for operably mounting each of said air guns with said support frame for forming an array;

said plurality of air guns forming said array arranged on said support frame in two parallel vertical planes with each vertical plane axis having four air guns disposed therein;

each of said vertical planes having positioned therein a first air gun and a second air gun with said first and second air guns space apart a distance of substantially 10 feet in a horizontal plane containing said first and second air guns;

each of said vertical planes having a third air gun and a fourth air gun positioned therein and disposed substantially midway between said first air gun and said second air gun, said third and fourth air gun being spaced apart a vertical distance of substantially 20 inches and located substantially equidistant from said horizontal plane containing said first and second air guns.

11. A marine seismic source array for producing a high resolution seismic signal in a body of water when towed behind a vessel at a predetermined depth below the water surface including:

a support frame;

means for locating said support frame at a desired depth below the water surface;

a plurality of eight air guns operably mounted on said support frame for simultaneous firing at a predetermined depth in the range of 1 to 3 meters to produce a desired tapered, heavy center, point source seismic signal; and said produced seismic signal having a primary signal strength of at least 7.1 bar-M and a primary to bubble pulse ratio of substantially 6.5.

12. An apparatus adapted for producing a seismic signal in a marine environment when towed by a marine vessel, including:

a support frame means for securing said support frame to a towing line extending from the marine vessel;

means for supporting said frame at a desired depth below the water surface;

a plurality of eight air guns forming an array having a longitudinal axis;

means for operably mounting each of said air guns with said support frame;

said plurality of eight air guns disposed in two parallel vertical planes disposed equidistant from and on opposite sides of said longitudinal axis of said array with 4 air guns in each plane, said planes being spaced apart a distance of approximately 2 feet;

a first air gun and a second air gun located in each vertical plane, said first air gun and said second air gun spaced apart a longitudinal distance of substantially 10 feet and located substantially at the same depth as the longitudinal axis a third air gun and a fourth air gun located in each vertical plane, said third air gun and fourth air gun located between and equidistant longitudinally of said first air gun and said second air gun, said third air gun and said fourth air gun being spaced apart a vertical distance of substantially 20 in and located substantially equidistant above and below the horizontal plane passing through said longitudinal axis.

13. A method of producing a desired marine seismic signal from a marine vessel including the steps of:

mounting a plurality of air guns on support frame to form an array having a longitudinal axis;

securing said support frame to a towing line from the marine vessel;

locating said frame at a desired depth below the water surface to position the plurality of air guns at a predetermined depth;

firing said plurality of air guns to release an energy charge of compressed air to produce a desired tapered, heavy center, point source seismic signal; and interacting the compressed air bubble for rapidly coalescing into a large number of relatively small air bubble to minimize the secondary bubble noise signal.

* * * * *